United States Patent
Haller et al.

(10) Patent No.: US 11,609,594 B2
(45) Date of Patent: Mar. 21, 2023

(54) STEERING DEVICE FOR VEHICLES

(71) Applicant: GRAMMER AG, Ursensollen (DE)

(72) Inventors: Erwin Haller, Birgland (DE); Jens Kolb, Königstein (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/360,492

(22) Filed: Jun. 28, 2021

(65) Prior Publication Data

US 2022/0001782 A1   Jan. 6, 2022

(30) Foreign Application Priority Data

Jul. 6, 2020 (DE) .......................... 102020117691.0

(51) Int. Cl.
| | |
|---|---|
| *G05G 1/08* | (2006.01) |
| *B60N 2/75* | (2018.01) |
| *B62D 1/04* | (2006.01) |
| *G05G 1/10* | (2006.01) |

(52) U.S. Cl.
CPC ............... *G05G 1/10* (2013.01); *B60N 2/797* (2018.02); *B62D 1/043* (2013.01); *G05G 1/105* (2013.01)

(58) Field of Classification Search
CPC . G05G 1/08; G05G 1/10; G05G 1/105; B60K 37/06; B60K 2370/77; B62D 1/02; B62D 1/043; B60N 2/797; H03J 5/04; H03J 5/16

See application file for complete search history.

(56) References Cited

U.S. PATENT DOCUMENTS

| | | | | |
|---|---|---|---|---|
| 2,738,758 | A | * 3/1956 | Cutler | .................. H03J 1/044 |
| | | | | 116/250 |
| 3,399,362 | A | * 8/1968 | Ma | ........................ H03J 5/04 |
| | | | | 334/51 |
| 4,991,461 | A | * 2/1991 | Sennett | ................. G05G 1/06 |
| | | | | 74/553 |
| 5,042,314 | A | 8/1991 | Ryter et al. | |
| 5,286,078 | A | * 2/1994 | Mottino | ................ B60N 2/797 |
| | | | | 296/153 |

(Continued)

FOREIGN PATENT DOCUMENTS

| | | | | |
|---|---|---|---|---|
| AT | | 11940 U1 * | 5/2011 | ............... B60N 2/24 |
| DE | | 19827781 | 1/2000 | |

(Continued)

OTHER PUBLICATIONS

Extended Search Report for European Patent Application No. 21181643.4, dated Nov. 23, 2021, 8 pages.

(Continued)

*Primary Examiner* — Adam D Rogers
(74) *Attorney, Agent, or Firm* — Sheridan Ross P.C.

(57) ABSTRACT

The invention relates to a steering device for vehicles, in particular forklifts, for carrying out a steering movement of the drivable vehicle on a surface by manual operation by a vehicle driver, wherein the steering device is attached to or in an armrest of a vehicle seat, wherein the steering device comprises at least one rotatable wheel element which can be at least partially grasped on the circumference by the fingers of a hand of the vehicle driver placed on the steering device and can be rotated about an axis of rotation for a steering movement.

19 Claims, 6 Drawing Sheets

(56) References Cited

U.S. PATENT DOCUMENTS

| | | | | |
|---|---|---|---|---|
| 5,379,663 A * | 1/1995 | Hara | ................. | G05G 9/04 |
| | | | | 345/161 |
| 5,456,333 A * | 10/1995 | Brandt | ............ | B60W 30/18045 |
| | | | | 180/336 |
| 5,566,778 A * | 10/1996 | Valier | ................. | B60N 2/767 |
| | | | | 180/336 |
| 5,938,282 A * | 8/1999 | Epple | ................. | B60N 2/797 |
| | | | | 180/315 |
| 6,898,496 B2 * | 5/2005 | Chernoff | ......... | B60W 30/18181 |
| | | | | 180/443 |
| 6,903,652 B2 * | 6/2005 | Noguchi | ................. | B60R 11/02 |
| | | | | 340/425.5 |
| 7,204,338 B2 * | 4/2007 | Katae | ................. | B62D 1/043 |
| | | | | 180/315 |
| 7,290,635 B2 * | 11/2007 | Bisick | ................. | B60N 2/797 |
| | | | | 180/326 |
| 7,436,398 B2 * | 10/2008 | Yuasa | ................. | B60K 37/06 |
| | | | | 200/5 A |
| 7,438,318 B2 * | 10/2008 | Sano | ................. | B60N 2/753 |
| | | | | 180/326 |
| 7,600,819 B2 * | 10/2009 | Armo | ................. | B60N 2/797 |
| | | | | 297/411.3 |
| 7,654,359 B2 * | 2/2010 | Ott | ................. | G05G 1/10 |
| | | | | 180/333 |
| 8,235,162 B2 * | 8/2012 | Wihinen | ................. | B60N 2/797 |
| | | | | 74/471 XY |
| 8,483,914 B2 * | 7/2013 | Copeland | ................. | E02F 9/2004 |
| | | | | 701/50 |
| 9,321,348 B2 * | 4/2016 | Peissner | ................. | B60K 35/00 |
| 9,751,572 B2 * | 9/2017 | Higashiguchi | ......... | B60K 20/02 |
| 11,285,850 B2 * | 3/2022 | Gayon | ................. | B60N 2/797 |
| 11,305,679 B2 * | 4/2022 | Lee | ................. | B60N 2/22 |
| 2008/0023250 A1 * | 1/2008 | Hefner | ................. | B62D 1/04 |
| | | | | 180/332 |
| 2018/0129240 A1 * | 5/2018 | Barzen | ................. | G05G 1/015 |
| 2021/0371261 A1 | 12/2021 | Yasukochi | | |
| 2022/0194267 A1 * | 6/2022 | Haller | ................. | B60N 2/797 |
| 2022/0194278 A1 * | 6/2022 | An | ................. | B60N 2/24 |

FOREIGN PATENT DOCUMENTS

| | | | | |
|---|---|---|---|---|
| DE | 19951379 | | 5/2001 | |
| DE | 19956870 | | 6/2001 | |
| DE | 102006018537 A1 * | | 11/2007 | ........... B60N 2/4693 |
| DE | 102014009358 A1 * | | 11/2014 | ............... G05G 1/10 |
| DE | 102017205110 A1 * | | 9/2018 | |
| EP | 0911548 A2 * | | 4/1999 | |
| EP | 0813993 | | 8/2002 | |
| EP | 1462905 A2 * | | 9/2004 | ............... G05G 1/08 |
| EP | 1959329 | | 8/2008 | |
| EP | 3626525 A1 * | | 3/2020 | ........... B60N 2/6009 |
| FR | 2845962 A1 * | | 4/2004 | ............. B60K 20/02 |
| FR | 2889125 | | 2/2007 | |
| FR | 2930653 A1 * | | 10/2009 | ............... G05G 1/01 |
| FR | 3072914 A1 * | | 5/2019 | ............... B60N 2/77 |
| GB | 2201758 A * | | 9/1988 | ........... B60N 2/4693 |
| JP | 10252100 A * | | 9/1998 | ............. E02F 9/2004 |
| JP | 2000118275 A | | 4/2000 | |
| JP | 2003-327059 | | 11/2003 | |
| JP | 2005170180 A * | | 6/2005 | |
| JP | 2010505676 A * | | 2/2010 | |
| SE | 512361 | | 3/2000 | |
| WO | WO 2015/136901 | | 9/2015 | |

OTHER PUBLICATIONS

Official Action with machine translation for Germany Patent Application No. DE 102020117691.0, dated Jun. 14, 2022, 12 pages.

Official Action for Germany Patent Application No. DE 102020117691.0, dated Oct. 18, 2022, 9 pages.

Official Action with machine translation for German Patent Application No. 102020117691.0, dated Apr. 22, 2021, 16 pages.

* cited by examiner

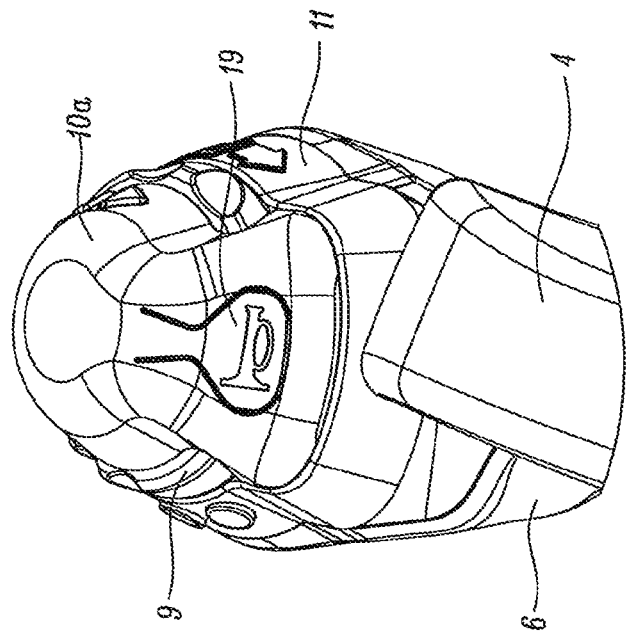
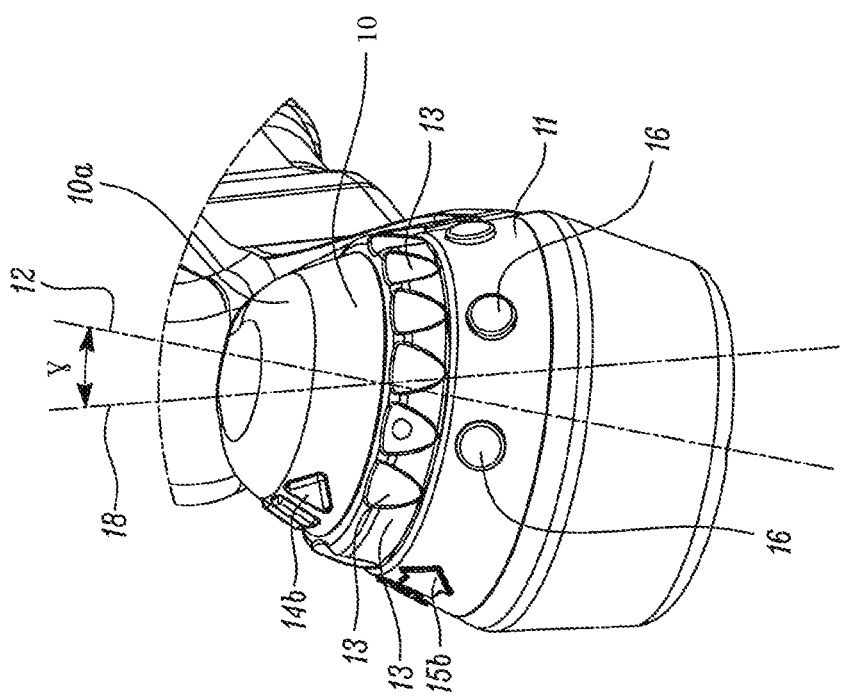
FIG. 5b
FIG. 5a

STEERING DEVICE FOR VEHICLES

CROSS-REFERENCE TO RELATED APPLICATION

This application claims the benefit of German Patent Application No. 102020117691.0 filed Jul. 6, 2020, the entire contents of which are incorporated herein by reference in their entirety.

FIELD

The invention relates to a steering device for vehicles, in particular forklifts, for carrying out a steering movement of the drivable vehicle on a surface by a hand movement by a vehicle driver.

BACKGROUND

A multitude of different steering devices exists, also for forklifts. Usually, standard steering wheels have hitherto been used, which are arranged in front of the vehicle seat and which, because of the position thereof, deprive the vehicle driver of the view of the goods to be transported on the forks of the forklift. In this case, the fact that the dashboard is often arranged in the front region in addition to the steering wheel plays a substantial role. If neither were present, the forklift driver would be able to look at the lower-level goods or the cargo positioned on the forks without any problems and thus ensure safer driving and transport of the cargo together with the pallet. Up to now, this has often been associated with the fact that the driver has to get up from the vehicle seat or bend forwards in order to ensure that the pallet or another object is neatly picked up by the forks.

Furthermore, it is desired that specific vehicles have a seat that can be rotated by 360 degrees, for example to allow the vehicle driver to also reverse having an optimal view of the route without twisting his upper body. This results not only in greater comfort for the vehicle driver, but also in improved ergonomics for that person. However, this is not easily possible since existing steering devices, such as the steering wheel mentioned, are arranged in the front dashboard region of the vehicle, such as a forklift, and thus the steering wheel is no longer accessible to the vehicle driver when the vehicle seat is pivoted by 180 degrees. Thus, the vehicle is no longer operable or steerable.

SUMMARY

Embodiments of the present disclosure provide a steering device for vehicles that provides the vehicle driver with a clear view of the region in front of the vehicle, in particular in the floor region of the vehicle, as well as a comfortable operation of a steering device of the vehicle regardless of the current rotary position of the vehicle seat.

The core idea of the invention is that the steering device for vehicles, in particular forklifts, for carrying out a steering movement of the drivable vehicle on a surface by manual operation by a vehicle driver, is attached to or in an armrest of a vehicle seat, and in that the steering device has at least one rotatable wheel which can be at least partially grasped on the circumference by the fingers of a hand of the vehicle driver placed on the steering device and can be rotated about an axis of rotation for a steering movement. The steering device can therefore be rotated together with the vehicle seat due to the arrangement thereof on the armrest, thus also allowing steering of the vehicle and possibly actuation of further functions of the vehicle when the vehicle seat is currently in a different rotary position. This also applies to a 180-degree rotary position of the vehicle seat.

The steering device is preferably arranged on the left armrest since a joystick is often provided on the right armrest, which joystick has various other functions, such as operating the forks of a forklift.

In addition, the steering device is advantageously designed in such a way that, in the knob-like design thereof, it can be covered from above with the palm of a hand and the fingers pointing downwards grasp the wheel element, so that a fine rotation of the wheel to the left and right results in a steering movement of the vehicle. For this purpose, the fingers with or without the thumb of the left hand are arranged on the outer circumference of the wheel element and can rotate the wheel element freely by placing the palm of the hand thereon. However, it should be noted in this case that the palm of the hand is arranged on a stationary head part which does not move together with the wheel element.

A design of this type of a steering device having a knob-like head part can preferably be rotated by an angle of rotation of 30° to 40° to the left and to the right, whereby the entire steering process can be initiated with the usual curve radii of a vehicle. In contrast, a conventional standard steering wheel, which is arranged in the front region of a vehicle, has an angle of rotation of +/−720°.

These small angles of rotation are possible due to the finely operable wheel in its outer circumference with the help of the fingers placed thereon.

The wheel element, which can also be referred to as a steering disc, adapts to a curved palm with a corresponding design together with the knob-like head part and a base part arranged there below in an ergonomically comfortable manner and thus allows for relaxed rotating of the wheel element and thus a sensitive steering process by slight movement of the fingers of that hand.

The comfort of the driver is therefore increased not only with regard to reaching the steering wheel, which was previously arranged in the front region on the dashboard, but also with regard to relaxed steering through small movements of the hand or fingers of the vehicle driver.

The wheel element which is rotatable about the axis of rotation is preferably oriented horizontally, which means that the axis of rotation is preferably oriented vertically. However, according to further embodiments, this axis can also be pivoted in any direction, i.e. forwards and to the side, in order, if necessary, to allow for a more comfortable operation depending on the position of the hand of the person in relation to their arm.

Above the edge element is the already mentioned knob-like head part, which is arranged in a stationary manner on the steering device and serves for the placement of the palm of the hand. This head part is ergonomically designed so that it fits well into the palm of the hand. It can preferably also be height-adjustable in order to space apart the fingers projecting downwards and the wheel element such that only the end regions of the fingers grasp the wheel element.

This has the advantage that an even more sensitive operation of the wheel element with the front regions of the fingers is made possible. This allows for a more sensitive steering process, in particular in warehouse regions in which forklifts are very often located.

The head part can be height-adjustable as a whole or only in parts, so that, for example, an upper cover of the head part can be moved upwards, which can result, among other things, in active ventilation around the entire upper functional block or a hood. A gap would thus arise between the cover and the rest of the head part, which gap would also allow ventilation from the inside relative to the hand by supplying air internally. This air would flow over the entire circumference of the head part downwards over the wheel element and the base part there below and would thus also prevent possibly damp fingers from slipping off the wheel element.

The device itself, which is preferably arranged in the front region of the armrest, in front of a preferably structurally customary armrest, can also advantageously be varied in terms of the distance thereof from the rest of the armrest. As a result, a user can place his arm in the usual way on the armrest, whereby the knob-like head part together with the rest of the steering device is spaced apart from the armrest in such a way that the steering device is optimally positioned in the palm of the hand at the correct distance from the rest of the forearm.

Below the wheel element, the already mentioned base part is located which is arranged in a stationary manner relative to the armrest and which is equipped with at least partially integrated first function keys and displays. Function keys and displays of this type can also be present in the knob-like head part as second function keys and displays. In this case, for example, other vehicle functions such as a light function, a turn signal function, a parking function, a horn function and the like. Various other sensors and actuators in passive or active form could also be operated by appropriately arranged switches on the head part or the base part, or their function could only be indicated by indicator lights. A change from forwards to backwards travel by means of a small finger movement is also conceivable due to actuating elements of this type on the steering device. A change from fast to slow driving may also be conceivable. The battery status could also be displayed as well as the active ignition. In summary, it can be stated that a multitude of function keys and function displays can be arranged in an innovative steering device of this type, all these additional functions being omitted as features of a dashboard, so that a dashboard, as well as a steering wheel, would be superfluous. This, too, thus provides a clear view of the forks of a forklift and generally of the floor region in front of a vehicle.

As a result of the arrangement of this steering device on the armrest of a vehicle seat, stress on the neck and shoulder muscles is advantageously reduced due to a lower or adapted steering angle range. The position of the steering device also remains constant in relation to the seat system when the position of the seat system changes, which allows for greater comfort for the operator. An easier exit from the vehicle is also possible due to the lack of a conventional steering wheel. Overall, an ergonomic improvement in posture in the seating system is thus possible.

The wheel element is advantageously equipped with finger grooves on the circumference, so that slipping of the fingertips or the end regions of the fingers that project from above and grip the wheel is not possible. A more sensitive rotating of the wheel is also possible.

The wheel or the wheel element or the steering disc can perform a rotary movement through an angle of rotation of preferably up to 40 degrees to the left and right, with 180 degrees also theoretically being possible. A corresponding limitation can be achieved to below 40 degrees if, for example, depending on the current speed of the vehicle, a smaller angle of rotation and thus a smaller steering movement is to be allowed in order to prevent the vehicle from tipping over due to excessive steering movement. This can be made possible by means of an appropriate electronic controller.

An already rotated wheel element can be acted upon with a restoring force by means of a corresponding annular spring or the like, so that the rotary wheel is automatically rotated back to a zero position when letting go or lifting the fingers from the rotary wheel. This is also known in the case of conservative steering wheels.

In addition, a rotary wheel or wheel element of this type can also have a damping force applied thereto. This can be achieved by means of honey motors or the like, so that a steering movement that is not too abrupt and is not too strong is possible within a short time.

The head part, the base part and the wheel element are preferably at least partially circular in order to allow for an ergonomically comfortable shape for the inside of a hand.

The steering device is arranged in front of the armrest when viewed in the vehicle direction with the vehicle seat direction and can be pivoted outwards by an angle relative to a longitudinal axis of the armrest with respect to the seat surface of the vehicle seat. This corresponds to an ergonomically relaxed, advantageous position of the hand relative to the rest of the forearm.

The head and base part can be designed to be extended at the rear towards the armrest for better support of the palm. This means that in the rear region of the head and base parts, these two parts are no longer circular or round, but have a bead-like extension that is particularly pleasant for the palm of a user placed thereon due to the ergonomics of the palm.

BRIEF DESCRIPTION OF THE DRAWINGS

Further advantageous embodiments result from the dependent claims and the drawings below. In the drawings:

FIG. 5a is a front view of the steering device according to the invention;

FIG. 5b is a rear view of the steering device according to the invention;

DETAILED DESCRIPTION

Figure 1:
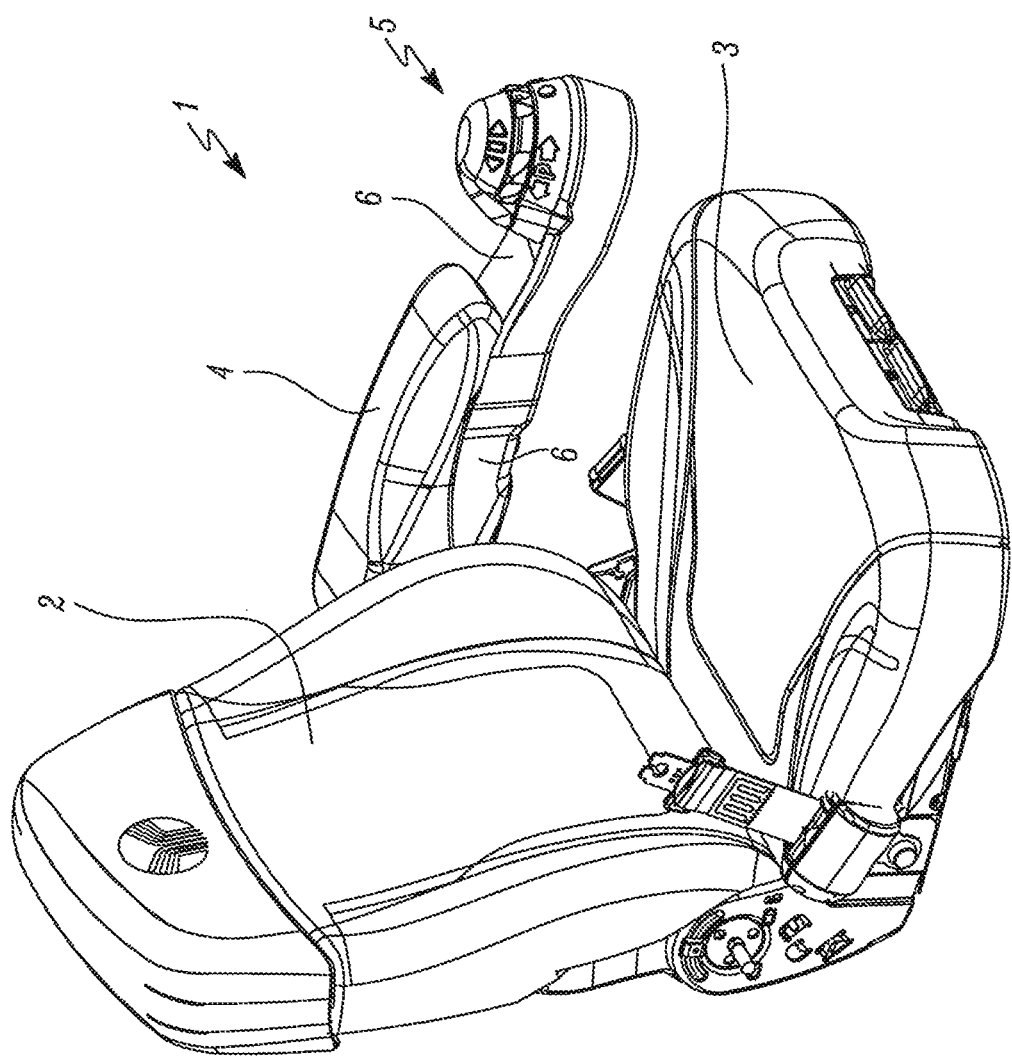
FIG. 1 is a perspective view of a vehicle seat having a steering device according to the invention.

FIG. 1 is the perspective view of a vehicle seat having the steering device according to the invention. The vehicle seat 1 has a backrest 2 and a seat part 3. An armrest 4 is arranged on the left side and has a steering device 5 according to the invention fastened thereto in the front region thereof.

The steering device 5 is fastened thereto with an arm-like component 6 in front of and below the armrest 4.

Figure 2:
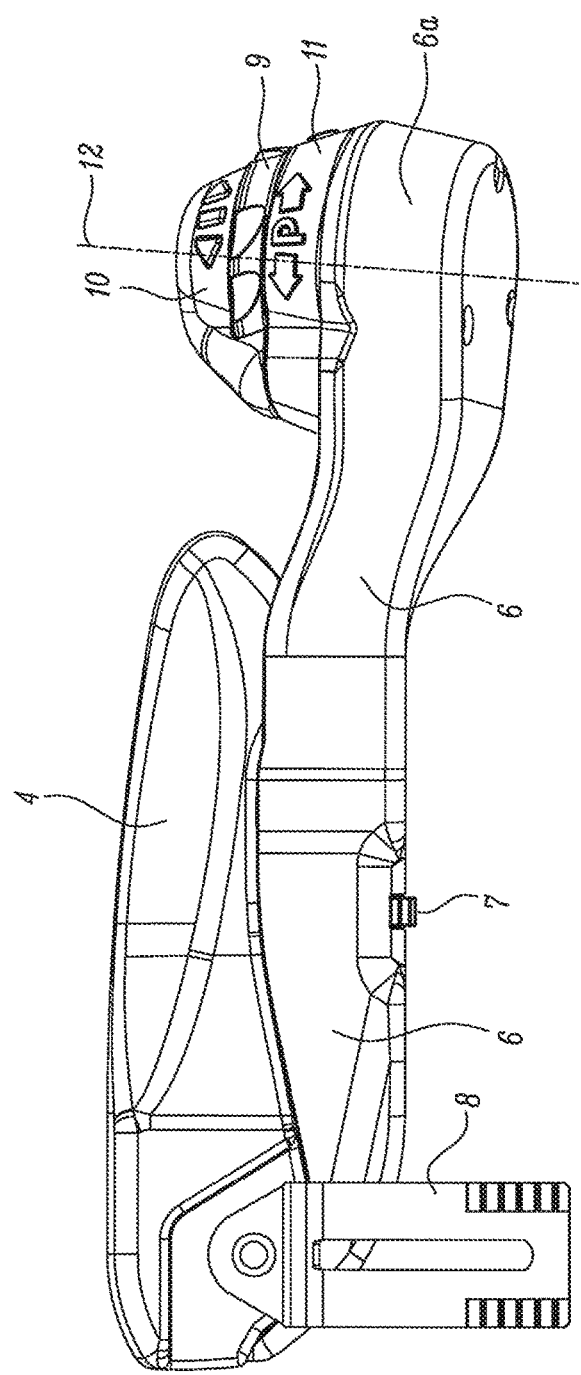
FIG. 2 is a side view of an armrest with a steering device according to the invention.

In FIG. 2, the steering device according to the invention is shown together with an armrest in a side view. This view clearly shows that an arm-like component 6 is fastened with a front region 6a in the rear region thereof below the armrest 4. An adjustment wheel 7 and a fastening element 8 serve to move or change the height of the armrest together with the steering device 5 according to the invention relative to the vehicle seat part.

The steering device 5 has a wheel element 9 which can be rotated about an axis of rotation 12. Above the wheel element 9, which can also be viewed as a steering disc, a knob-like head part 10 is arranged in a stationary manner relative to the rest of the steering device. This cannot be rotated about the axis of rotation 12.

Likewise, the base part 11 arranged therebelow cannot be rotated relative to an axis of rotation 12. Only the wheel element 9 is designed to be rotatable. This is described in more detail later.

All three parts 9, 10 and 11 are fixedly arranged on the arm-like boom 6 above a front portion 6a of said arm-like boom.

Figure 3:
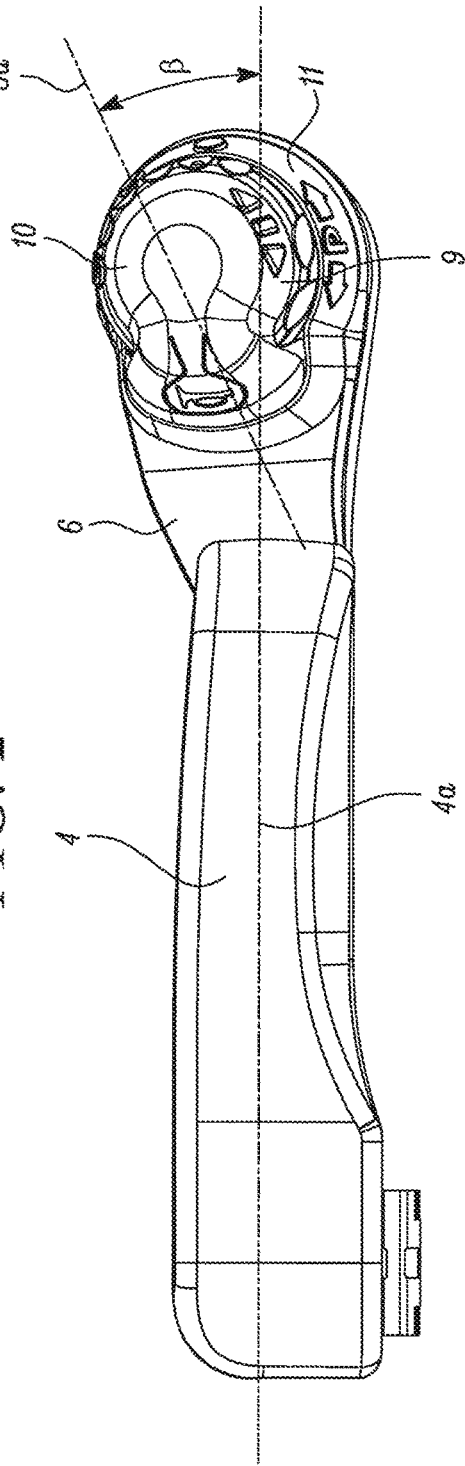
FIG. 3 is a plan view of the armrest with the steering device according to the invention.

In FIG. 3, the armrest and the steering device according to the invention according to FIG. 2 are shown in a plan view. From this view, it can again be seen that the steering device is arranged in front of the armrest 4. It should be noted in this case that the steering device 5 is pivoted outwards at a slight angle, preferably relative to a longitudinal axis 4a of the armrest. This can be seen from a comparison of the longitudinal axis 4a of the armrest and a longitudinal axis 5a of the steering device. An angle β between the two axes reflects this pivoting or rotary position. This rotary position can advantageously have the effect that the operator can operate the steering device even more comfortably with the forearm placed on the armrest.

Figure 4:
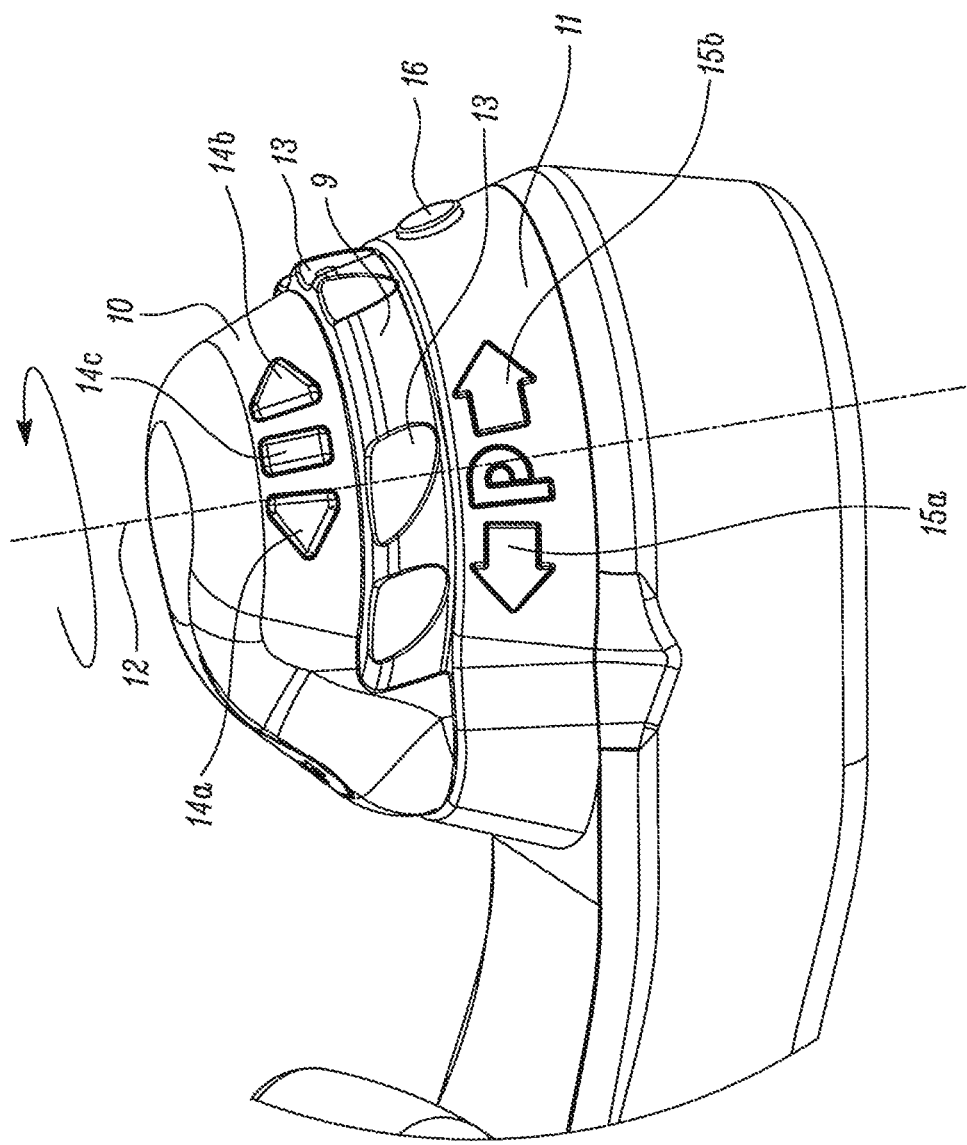
FIG. 4 is a side view of the steering device according to the invention.

In FIG. 4, the steering device according to the invention is shown in a side view without further armrest. It can be seen from this view that the steering device not only comprises the wheel element 9 which is rotatable about the axis 12, the wheel element having finger notches 13 arranged thereon, in which finger notches the fingers can comfortably in their in the end regions thereof in order to rotate the wheel element 9. Rather, the stationary base part 11 having additional operating switches 15a, 15b and indicator lights 16 arranged therebelow can also be seen. The operating switches 15a and 15b can, for example, be operated with the thumb of the left hand in order to assume a parking position or to activate or deactivate a parking brake. For this purpose, it is not necessary for the remaining fingers of the left hand to be removed from the wheel element 9.

The head part 10 also has a second function display and function-actuating elements. For example, a turn signal of the vehicle can be actuated by actuating elements 14a and 14b. However, these actuating elements can also be used to move the vehicle forwards and backwards. A neutral position would then be possible with the actuating element 14c by actuating it.

In FIG. 5a, the steering device is shown in a front view. This view clearly shows that, in accordance with the angle γ, there is a pivoting of the steering device between an axis of rotation 12 of the steering device and a vertical axis 18 in order to allow the even more ergonomic operation of the steering device by means of a person's hand. It has been shown that a more relaxed operation of the steering device with the wheel element to be rotated is thus possible in the case of a slight inwards turn of the hand towards the vehicle seat.

Preferably 4 or even 5 fingers can be placed on the wheel element at the same time in order to operate the wheel element with a corresponding sensitivity.

A top cover region 10a or a cover 10a of the head part 10 can be used to allow the wheel element to be shifted up and down separately in order to set an optimal distance between the fingers projecting downwards and the palm placed on the head part 10 in such a way that only the end regions of the fingers rest on the wheel element. Of course, this depends on the finger length of an individual person.

Further indicator lights 16 can be seen on the base part 11.

In FIG. 5b, the same steering device is shown from the rear. This rear side of the steering device, which can easily be viewed by an operator of the steering device, shows that a horn-actuating element 19 and the extension 11 thereof are incorporated in the head part as a rocker component. This horn-actuating element 19 can thus be actuated simply and easily with the ball of the palm of the resting hand or an adjacent region without having to remove the rest of the hand from the steering device.

Figure 6C:
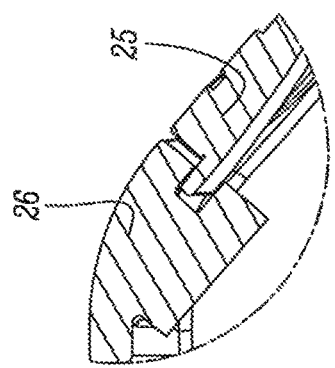
FIG. 6c is a detail view according to detail F from FIG. 6b of a detail of the steering device according to the invention.
Figure 6B:
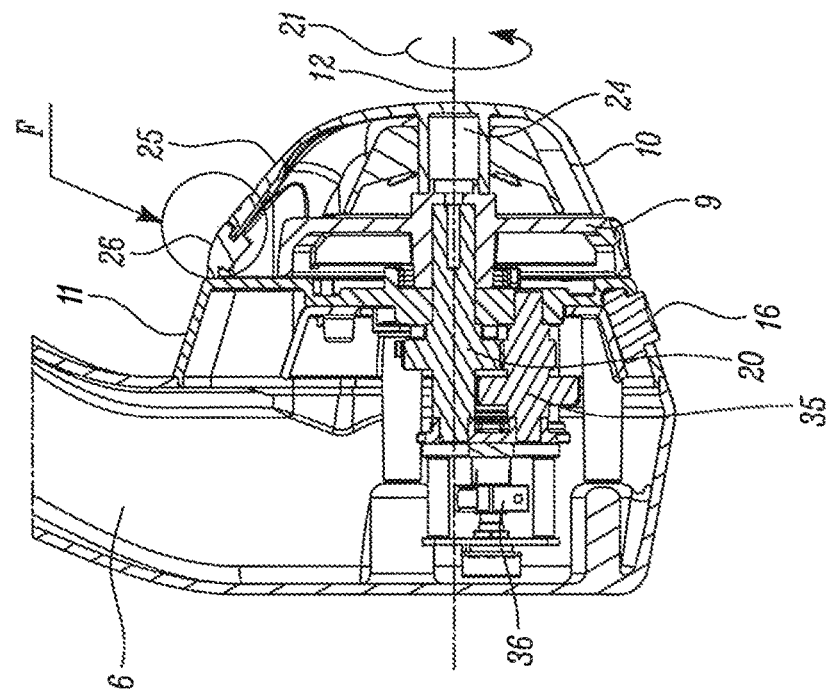
FIG. 6b is a lateral sectional view according to the section E-E from FIG. 6a of the steering device according to the invention.
Figure 6A:
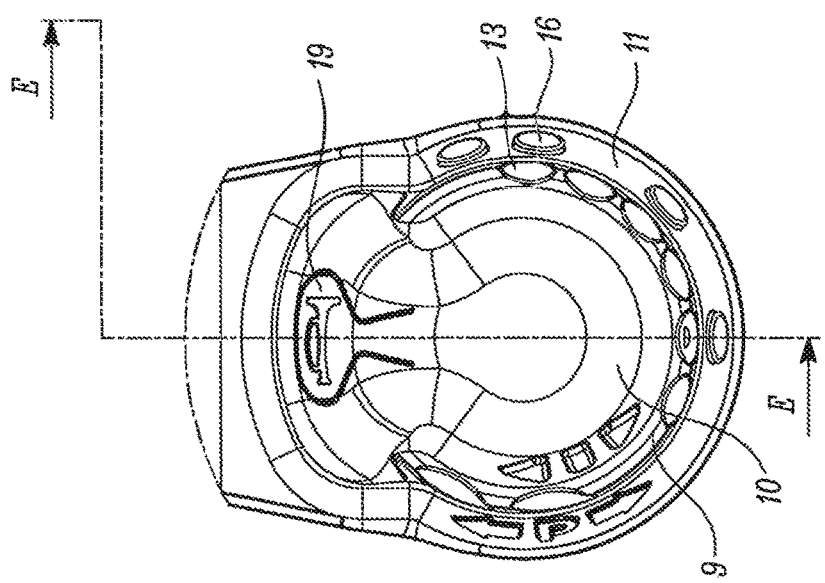
FIG. 6a is a plan view of the steering device according to the invention.

In FIG. 6a, the steering device according to the invention is shown in a plan view. This view again shows the horn-actuating element 19 as well as the finger notches 13 in the wheel element 9 and various indicator lights in the base element 11. According to a section E-E, a cross-sectional view is shown in FIG. 6b in accordance with this FIG. 6a. This view shows the complex internal structure of an innovative steering device of this type. It can be seen that the wheel element 9 can be rotated according to a rotary movement 21 about the axis of rotation 12. For this purpose, the wheel element is arranged around a centrally arranged rotary part 20, which in turn drives a further rotary part 35, for example by means of gear transmission, and this in turn drives further rotating parts 36. In this way, the rotary position or steering position can be passed on on the basis of electronic scanning. A resilient bearing 20 of the wheel element 9 is provided.

The component 20 is rotatably mounted on the upper side by means of a bearing element 24 arranged in the head part 10, as is the wheel element 9.

A horn-actuating element 19 is designed as part 25 of the head part hood so that it engages in a corresponding counterpart 26 of the head part hood in a flange-like manner, so that this horn-actuating element can only be pressed inwards when there is a higher pressure load, thereby compressing a spring element arranged behind it and triggering a horn signal. This is shown again as detail F in FIG. 6c.

Figure 7:
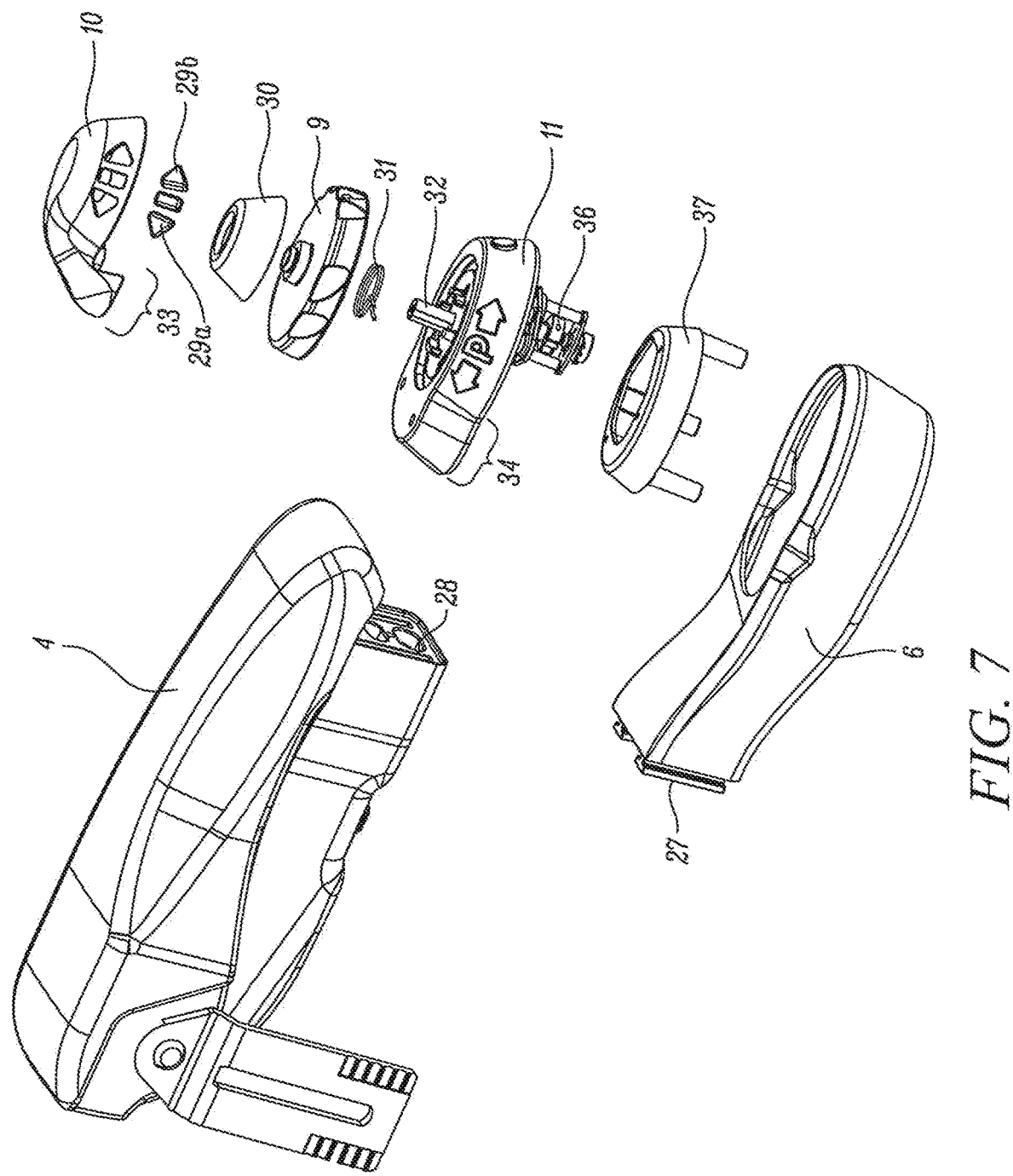
FIG. 7 is an exploded view of the individual components of the steering device according to the invention.

In FIG. 7, the components of the steering device are shown again in an exploded view. On an armrest 4, the holding arm or the arm-like component 6 of the steering device is arranged displaceably from bottom to top having, for example, two rail-like elements 27 on the front side. The correspondingly complemented counterparts are shown with reference sign 28 on the front of the armrest.

The head part 10, like the base part 11, has a kind of extension in the structure thereof at the rear, i.e. towards the armrest. This extension 33, 34 is used for better placement of the ball of the palm and the entire inner surface of the hand.

Pressable or actuatable actuating elements 29a, 29b are arranged within corresponding recesses of the head part 10 of complementary design.

A cone-like component 30 is provided for a corresponding bearing between the wheel element 9 and the head part 10.

The wheel element 9 can be force-loaded by means of an annular spring 31 so that it resets by itself, for example. For this purpose, the spring 31 is arranged on an axis 32 which is connected to corresponding sensors and rotating components 36 within the base part.

The base part 11 is inserted into the arm-like component 6 for fixed anchoring via an intermediate piece 37, which has a plurality of feet on the underside.

All features disclosed in the application documents are claimed as being substantial to the invention, provided that they are, individually or in combination, novel over the prior art.

LIST OF REFERENCE SIGNS

Vehicle seat
2 Backrest
3 Seat part
4 Armrest
4a Longitudinal axis
5 Steering device
5a Longitudinal axis
6 Arm-like boom
6a Front portion, front region
7 Adjustment wheel
8 Fastening element
9 Wheel element
10 Knob-like head part, head part
10a Top cover region, cover of the head part
11 Base part, stationary base part, extension
12 Axis of rotation, axis
13 Finger notches
14a Actuating element
14b Actuating element
14c Actuating element
15a Operating switch
15b Operating switch
16 Indicator lights
18 Vertical axis
19 Horn-actuating element
20 Resilient bearing, centrally arranged rotary part, component
21 Rotary movement
24 Bearing element
35 Part of the head part hood
26 Counterpart
27 Rail-like elements
28 Complemented counterparts
29a Actuating element
29b Actuating element
30 Cone-like component
31 Coil spring, spring
32 Axis
33 Extension
34 Extension
35 Rotary part
36 Rotating components
37 Intermediate piece
E-E Section
β Angle
γ Angle

What is claimed is:

1. A steering device for a vehicle, the steering device comprising:
at least one rotatable wheel element, wherein a circumference of the rotatable wheel element can be at least partially grasped by fingers of a hand of a driver of the vehicle placed on the steering device, wherein the rotatable wheel element can be rotated about an axis of rotation, wherein an arm that includes a front region and a rear region connects the steering device to an armrest of a vehicle seat, wherein the rear region of the arm is disposed below the armrest and connects the arm to the armrest, wherein the steering device is disposed on a first side of the front region, wherein at least one of a distance of the steering device from an end of the armrest, a first angle of the axis of rotation of the steering device relative to a vertical axis, and a second angle of a longitudinal axis of the steering device relative to a longitudinal axis of the armrest can be varied, and wherein a first rotary component of the steering device is disposed at least partially within an interior of the front region of the arm.

2. The steering device according to claim 1, wherein the axis of rotation is aligned vertically.

3. The steering device according to claim 1, further comprising:
a head part, wherein the head part is arranged in a stationary manner relative to the armrest, and wherein the head part is arranged above the rotatable wheel element for the placement of a palm of the hand.

4. The steering device according to claim 3, wherein the head part is at least in part height-adjustable in order to space apart the fingers projecting downwards and the rotatable wheel element such that end regions of the fingers grasp the rotatable wheel element.

5. The steering device according to claim 1, wherein a base part is arranged below the rotatable wheel element in a stationary manner relative to the armrest, the base part having at least partially integrated first function keys.

6. The steering device according to claim 5, wherein second function keys are arranged on a head part, the first and second function keys being further vehicle functions, the further vehicle functions including at least one of light functions, turn signal functions, a parking function, and a horn function.

7. The steering device according to claim 5, wherein a head part, the base part and the rotatable wheel element have an at least partially circular design.

8. The steering device according to claim 5, wherein a head part and the base part are extended at a rear of the head part and the base part towards the armrest to support a palm of the hand.

9. The steering device according to claim 1, wherein the rotatable wheel element has finger grooves on the circumference, and wherein the front region is disposed in front the armrest along a first direction of the longitudinal axis.

10. The steering device according to claim 1, wherein the rotatable wheel element can perform a rotary movement by an angle of rotation of up to 180° in a clockwise direction or in a counterclockwise direction, and wherein the rear region of the arm includes rails that connect the arm to the armrest.

11. The steering device according to claim 10, wherein the rotary movement can be acted upon by a restoring force.

12. The steering device according to claim 10, wherein the angle of rotation is adapted to a current driving speed of the vehicle.

13. The steering device according to claim 10, wherein the rotary movement is acted upon by a damping force.

14. The steering device according to claim 1, wherein the steering device is arranged in front of the armrest when viewed in a vehicle seat direction.

15. The steering device according to claim 1, wherein the rotatable wheel element can perform a rotary movement by an angle of rotation of up to 40° in a clockwise direction or in a counterclockwise direction.

16. The steering device according to claim 1, wherein the steering device further comprises a plurality of finger notches.

17. The steering device according to claim 1, wherein the steering device includes a head part that is fixed relative to the armrest, and wherein the head part is disposed on the rotatable wheel element.

18. The steering device according to claim 1, wherein the rotatable wheel element is mounted on a base part, and wherein the base part is connected to the front region of the arm.

19. The steering device according to claim 1, wherein a rotation of the rotatable wheel element actuates steering of the vehicle.

* * * * *